Feb. 28, 1950     D. A. MIDDAUGH     2,498,696
WORK HOLDER
Filed Nov. 29, 1945
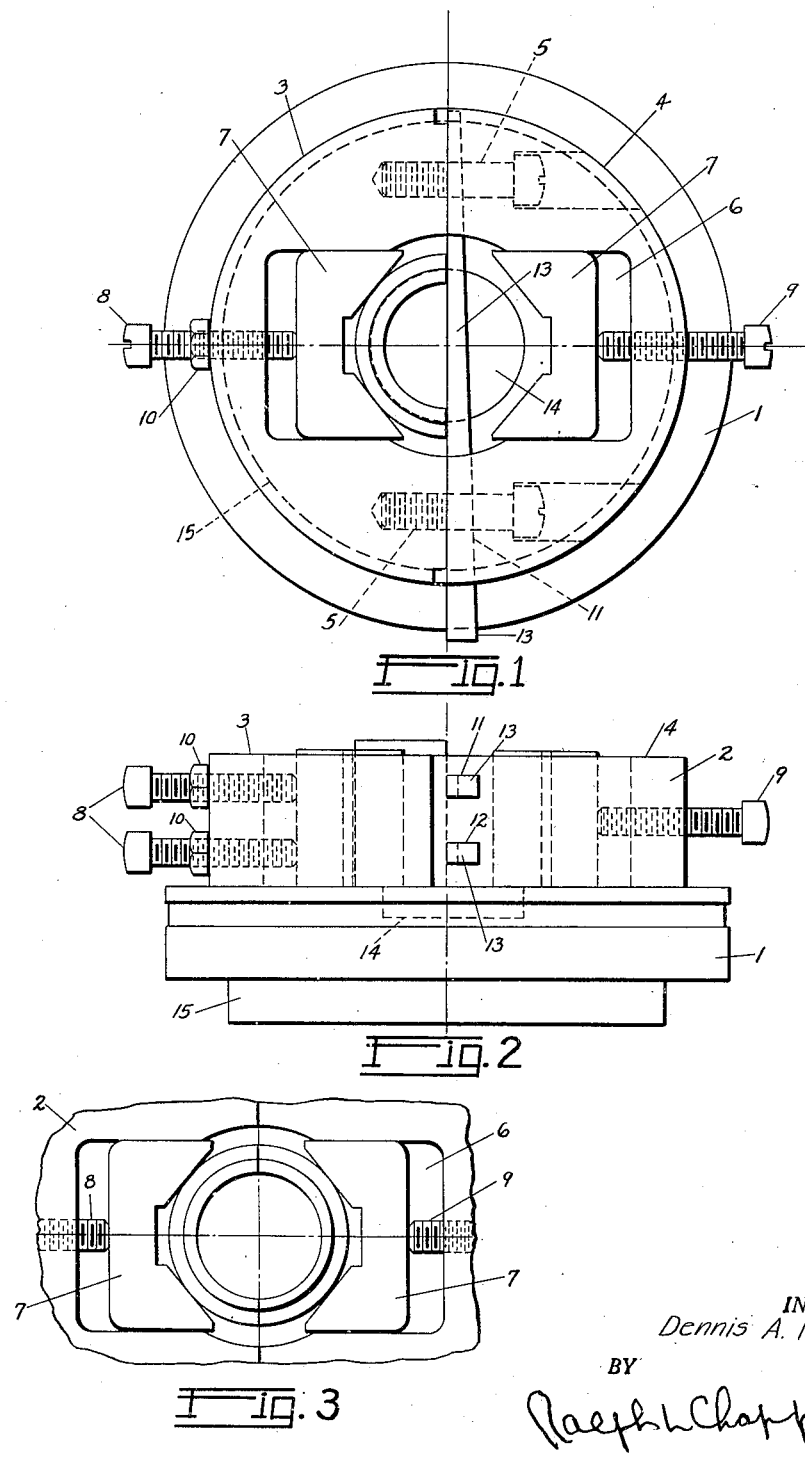
INVENTOR.
Dennis A. Middaugh
BY
Ralph L. Chappell
ATTORNEY Patented Feb. 28, 1950

2,498,696

UNITED STATES PATENT OFFICE 2,498,696

WORK HOLDER

Dennis A. Middaugh, Jersey City, N. J.

Application November 29, 1945, Serial No. 631,766

3 Claims. (Cl. 77—63)

(Granted under the act of March 3, 1883, as amended April 30, 1928; 370 O. G. 757)

The present invention relates to a work holder and has special reference to a fixture for holding split bearings while work is being performed upon them.

More particularly this invention relates to a fixture having means for centering thereon the two halves of a split bearing so that the bearings can be machined and finished accurately by relatively unskilled workers. With the present fixture a uniform thickness of babbitt is insured in finished babbitted bearings.

An object of this invention is to provide a fixture in which split bearings can be accurately and easily centered and then fixedly maintained while work is performed upon them.

Another object is to provide such a fixture of simple construction that can be quickly mounted in machines for working on the bearings.

Further objects and advantages of this invention as well as its construction, arrangement and operation are apparent from the following description and claims in connection with the accompanying drawing, in which:

Fig. 1 is a top plan view of the fixture with half of a split bearing mounted thereon;

Fig. 2 is a side elevational view of the fixture and bearing half shown in Fig. 1, and Fig. 3 is a top plan view of a complete split bearing clamped between the positioning members of the fixtures.

A split bearing fixture comprises a circular faceplate 1 and a circular casing 2 mounted thereon. The casing 2 is preferably formed in two halves with one half 3 formed integrally with the faceplate 1 and the other half 4 secured to the half 3 by means of screws 5. The casing 2 is provided with a central, elongated, radially extending groove 6 that preferably extends completely through the casing 2 in the direction of its thickness.

The groove 6 is of uniform width throughout except at the central portion where it is enlarged. Positioned in the groove 6 for free sliding movement, adjacent each end thereof, is a work-engaging positioning block 7. The blocks 7 are preferably V-blocks as shown in Figs. 1 and 3 and are of substantially the same width as the width of the slot 6 so that the sides of the slot 6 act as guides for the blocks 7. A pair of adjusting screws 8 for actuating blocks 7 is threaded into tapped openings that connect with one end of the groove 6 and a single adjusting screw 9 is threaded into a tapped opening in the opposite side of casing 2 and connects with the opposite end of the groove 6. Lock nuts 10 are preferably provided for each of the adjusting screws 8 and if desired may be provided for the adjusting screw 9. Screws 8 and 9 are arranged to bear against and adjust blocks 7.

A pair of slots 11 and 12 extend from one side of the casing to the other and have one side thereof accurately located along the center line of the fixture normal to the direction of movement of the V-blocks 7. Positioning bars or gibs 13 are positioned in the slots 11 and 12 so that one face of each gib 13 lies in a plane passing through a center line of said fixture and normal to the direction of movement of said blocks. To position a split bearing in the fixture the V-blocks 7 are retracted and one half of a split bearing is positioned in the groove adjacent the divergent faces of the V-block 7 that is actuated by the adjusting screws 8. The gibs 13 are positioned in the slots 11 and 12. Thereafter the adjusting screws 8 are tightened to move the bearing half into contact with the gibs 13 at which time the ends of the bearing half will be exactly on the center line of the fixture. The lock nuts 10 are then tightened to prevent any further movement thereof. When one half of the split bearing has been positioned, as above described, the two gibs are withdrawn and the other bearing half is inserted adjacent the divergent faces of the other V-block 7. The adjusting screw 9 is then tightened to bring the second half of the bearing into contact with the half that was first positioned, at which time the split bearing is clamped in the exact center of the fixture. The faceplate is formed with a central recess 14 to provide clearance for bearing flanges and tools. The fixture with the bearing securely clamped therein is then mounted in a suitable machine such as a lathe to permit boring and finishing of the bearing.

For the purpose of mounting the fixture in a machine the faceplate can be provided with a boss 15 for engagement with the clamping jaws on the machine. Any other suitable means can be employed for mounting and truing the fixture in the machine to be used.

The present fixture has been described as including V-blocks for clamping a split bearing therebetween. This enables bearings of different sizes to be clamped without necessitating the replacing of the positioning blocks. However, other types of positioning blocks can also be employed.

It is to be understood that various modifications and changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A work holder comprising body means, plural opposed first means on said body means independently adjustable toward and away from each other, plural second means on said body means for independent free sliding movement along a path between the first means, the second means being adapted for abutting engagement with the first means, and removable third means on said body means extending across said path and establishing a reference surface substantially normal to said path.

2. A work holder comprising a body, a pair of opposed actuating elements on said body independently adjustable toward and away from each other, a pair of work-engaging members mounted on said body for independent free sliding movement along a path between said elements, said members being adapted for abutting engagement with said elements, and removable means on said body extending across said path and establishing a reference surface substantially normal to said path.

3. A work holder comprising a body, a pair of opposed screws on said body independently adjustable toward and away from each other, a pair of work-engaging members mounted on said body for independent free sliding movement along a path between said screws, said members being adapted for abutting engagement with said screws, and a removable gib on said body extending across said path and establishing a reference surface substantially normal to said path.

D. A. MIDDAUGH.

REFERENCES CITED

The following references are of record in the file of this patent:

UNITED STATES PATENTS

| Number | Name | Date |
|---|---|---|
| 341,767 | Otto | May 11, 1886 |
| 893,875 | Schneider | July 21, 1908 |
| 1,082,588 | Gross | Dec. 30, 1913 |
| 1,284,456 | Richards et al. | Nov. 12, 1918 |
| 1,290,874 | Baker et al. | Jan. 14, 1919 |
| 1,625,032 | Keltler | Apr. 19, 1927 |
| 1,938,337 | Janiszewski | Dec. 5, 1933 |